United States Patent [19]

Kobayashi et al.

[11] Patent Number: 5,025,666

[45] Date of Patent: Jun. 25, 1991

[54] TRANSDUCER WITH BUILT-IN PRINTED CIRCUIT BOARD

[75] Inventors: Hiroshi Kobayashi, Kanagawa; Toshiharu Itoh, Aichi, both of Japan

[73] Assignees: Nissan Motor Company, Limited, Yokohama; NGK Spark Plug Co., Ltd., Nagoya, both of Japan

[21] Appl. No.: 547,329

[22] Filed: Jul. 5, 1990

Related U.S. Application Data

[63] Continuation of Ser. No. 59,815, Jun. 9, 1987, abandoned.

[30] Foreign Application Priority Data

Jun. 10, 1986 [JP] Japan ........................... 61-87175[U]

[51] Int. Cl.$^5$ ........................................... G01N 29/00

[52] U.S. Cl. ...................................... 73/632; 310/327

[58] Field of Search ................. 73/629, 632, 630, 631, 73/642; 310/326, 327; 361/398

[56] References Cited

U.S. PATENT DOCUMENTS

| | | | |
|---|---|---|---|
| 4,391,144 | 7/1983 | Diederichs | 73/629 |
| 4,556,814 | 12/1985 | Ito et al. | 310/326 |
| 4,567,395 | 1/1986 | Pundarika | 73/744 |
| 4,600,215 | 7/1986 | Kuroki et al. | 280/707 |
| 4,618,797 | 10/1986 | Cline | 310/339 |
| 4,620,438 | 11/1986 | Howng | 73/115 |

OTHER PUBLICATIONS

Lyman, J., "Flexible Circuits Bend to Designers's Will", Electronics, Sep. 15, 1977, pp. 97-105.

*Nissan Technical Report*, No. 20, pp. 98-101.

National Technical Report, vol. 29, No. 3, pp. 144-147.

*Primary Examiner*—Jerry W. Myracle

*Attorney, Agent, or Firm*—Foley & Lardner

[57] ABSTRACT

An ultransonic transducer includes a vibrator positioned within a housing. The vibrator has a vibrator casing and a vibrator element or oscillation body. The vibrator casing has a wall defining an internal space receiving an electronic transducer circuit. The vibrator casing is elastically damped for stabilizing vibration within a minimum period so that vibration for generating an ultrasonic wave may not influence detection of the ultrasonic wave reflected by an object. The electric transducer circuit is also elastically isolated from the vibration casing via an elastic cover so as to avoid influence of the vibration of the vibrator, and connected to the oscillation body for generating and receiving signals.

40 Claims, 1 Drawing Sheet

TRANSDUCER WITH BUILT-IN PRINTED CIRCUIT BOARD

This application is a continuation of application Ser. No. 07/059,815, filed June 9, 1987, now abandoned.

BACKGROUND OF THE INVENTION

1. Field of the Invention

The present invention relates to an ultrasonic transducer which incorporates a transmitter circuit and a receiver circuit and is generally designed for measuring distance to an object by measuring a period of time from transmission to receipt of an ultrasonic wave reflected from the object. More specifically, the invention relates to an ultrasonic transducer applicable to an automotive vehicle for monitoring relative dimensions, such as relative distance between a vehicle body and a road surface. Further, the invention relates to a compactly constructed ultrasonic transducer adapted for automotive use in suspension control, vehicular height control and so forth.

2. Description of the Background Art

In the recent years, there have been proposed various constructions of ultrasonic transducers for use in automotive control systems, such as suspension control, height control and so forth. For example, an automatic automotive suspension control system employing an ultrasonic transducer as a road roughness sensor has been disclosed in the U.S. Pat. No. 4,600,215, issued on July, 15, 1986, to Kuroki et al. In this reference, the ultrasonic transducer is installed on the lower surface of the vehicle body at an appropriate position and exposed to the outside of the vehicle body. Therefore, the ultrasonic sensor is usually is subject to dust, splashed water, muddy water and so forth. The ultrasonic transducer applicable for the aforementioned suspension control system has been disclosed in "Nissan Technical Report" No. 20, pages 98 to 101.

In addition, the dust- and water-proofing construction of the ultrasonic transducer has been disclosed in "National Technical Report" Vol. 29, No. 3, pages 144 to 147, the Japanese Utility Model First (unexamined) Publication (Jikkai) Showa 59-166599, and the Japanese Utility Model First Publication (Jikkai) Showa 59-164298.

Such ultrasonic tranducers have relatively low resonation frequency, e.g. 40 KHz. This causes echo vibration when the ultrasonic wave is generated in the ultrasonic transducers. The echo vibration caused in the ultrasonic transducer apparently interferes with acurate measurement of the distance. In order to avoid this, it is conventional construction of a road roughness sensor to have composed of separately installed ultrasonic transducers, one of which serves as an ultrasonic wave transmitter and the other of which serves as an ultrasonic wave receiver. This makes the road roughness sensor bulky and causes difficulty in installation on the undersurface of the vehicle body. Furthermore, since the conventional road roughness sensor requires two ultrasonic transducers, it results in relatively high costs.

SUMMARY OF THE INVENTION

Therefore, it is an object of the present invention to provide an ultrasonic transducer which can commonly be used for transmitting and receiving ultrasonic waves without causing substantial interference of echo vibration.

Another object of the invention is to provide a road roughness sensor for an automotive suspension control system, which is compact enough for conveniently installing in the under-surface of a vehicle body.

In order to accomplish the abovementioned and other objects, an ultrasonic transducer, according to the present invention, includes a vibrator casing and an oscillation body or vibrator housed within the transducer housing or protective housing. The vibrator casing has a wall defining an internal space receiving an electronic circuit. The vibrator casing is elastically damped for stabilizing vibration within a minimum period so that vibration for generating ultrasonic wave may not influence the detection of the reflected ultrasonic wave reflected by an object. The electric circuit is also elastically isolated from the vibration casing using an elastic cover so as to avoid influence of the vibration of the vibrator, and connected to the vibrator or oscillation body for generating and receiving signals.

According to one aspect of the invention, an ultrasonic transducer comprises a vibrator drivable at an ultrasonic frequency for generating an ultrasonic wave, an electric circuit associated with the vibrator for converting an electric signal to an energy for driving the vibrator and/or detecting vibration of the vibrator and converting vibration energy of the vibrator into an electric signal, and an elastic means elastically damping oscillation of the vibrator so that oscillation of the vibrator can be stabilized within a given period of time which is shorter than a possible minimum interval between transmission of an ultrasonic wave toward an object and reception of an ultrasonic wave reflected by the object.

According to another aspect of the invention, an ultrasonic transducer comprises a vibrator system drivable at ultrasonic frequency for generating an ultrasonic wave, the vibrator system comprising a vibrator body and a vibrator casing housing therein the vibrator body for oscillation therewith at the, ultrasonic frequency for generating acoustic vibration in the ultrasonic frequency range, an electric circuit built-in the vibrator casing and associated with the vibrator body for converting an electric signal to an energy for driving the vibrator body and/or detecting vibration of the vibrator body and converting vibration energy of the vibrator into an electric signal, and an elastic means isolating the electric circuit from the vibrator casing.

In the preferred construction, the vibrator is disposed within a transducer housing and elastically supported therein by means of an elastic damper. On the other hand, the vibrator comprises a vibrator casing and a vibrator body disposed within an internal space defined in the vibrator casing, the vibrator body being connected to the electric circuit for receiving an electric signal to oscillate at a predetermined frequency in an ultrasonic wave frequency range to drive the vibrator casing therewith. The vibrator casing is made of a material having lower acoustic impedance than that of metal. Preferably, the vibrator casing is made of a synthetic resin, more preferably of a foamed resin.

The electric circuit may include a transmitter circuit cooperated with the vibrator for converting the electric signal into oscillation energy for generating an ultrasonic wave, and a receiver circuit cooperated with the vibrator for converting oscillation energy into an electric signal. The transmitter circuit and the receiver circuit are formed on flexible printed circuit board. The transmitter circuit and the receiver circuit are formed on a common flexible printed circuit board.

In the preferred construction, the vibrator housing defines an annular enclosed space to receive therein the printed circuit boards. The printed circuit boards are received in the enclosed space in such a manner that a plane on which the transmitter and/or receiver circuits are formed is directed substantially parallel to a vibration axis of the vibrator.

The ultrasonic transducer may further comprise an elastic vibration isolator isolating the printed circuit boards from the vibrator casing.

DESCRIPTION OF THE PREFERRED EMBODIMENT

Figure 1:
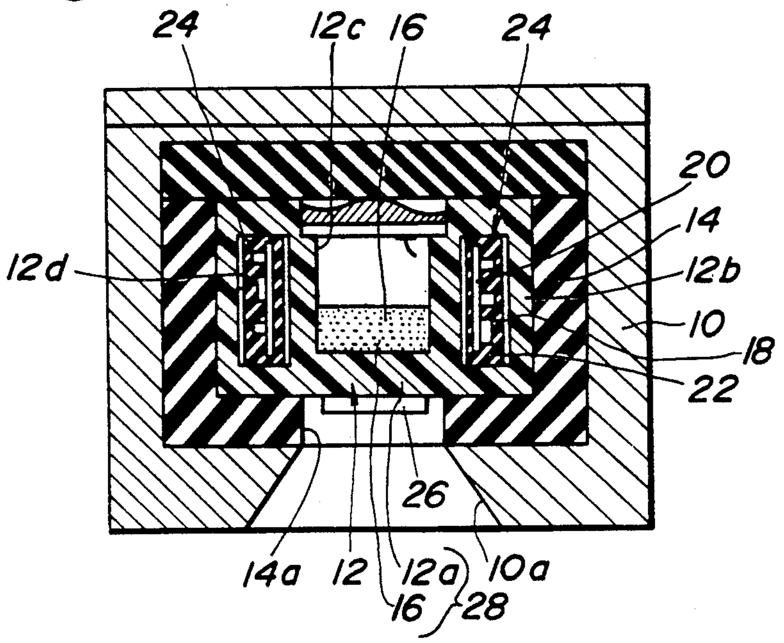
FIG. 1 is a section of the preferred embodiment of an ultrasonic transducer according to the invention.

Referring now to the drawings, particularly to FIG. 1, the preferred embodiment of an ultrasonic transducer, according to the present invention, is applicable for monitoring relative distance between the under-surface of a vehicle body and a road surface and thus monitors vehicular height as a control parameter for an automotive suspension control system, an automotive height control system and so forth. In the former case, the output signal of the ultrasonic transducer serves as a signal representative of a road roughness as disclosed in the U.S. Pat. No. 4,600,215. On the other hand, in the later case, the output signal of the ultrasonic wave directly represents the height position of the vehicle body so as to allow the height control system to maintain the vehicle body height within a pretermined height range.

As shown in FIG. 1, the ultrasonic transducer has a generally cylindrical protective housing 10. The protective housing 10 is to be fixedly mounted on the undersurface of the vehicle body. The protective housing defines an internal space in which an oscillator or vibrator casing 12 is housed. An elastic vibration insulator 14 is interposed between the inner periphery of the protective housing and the outer periphery of the oscillator casing 12.

The oscillator casing 12 is formed of a synthetic resin, such as foamed plastic, e.g. epoxy resin. The oscillator casing 12 is formed into an essentially cylindrical construction having a bottom wall **12*a* and a generally cylindrical side wall 12*b*. A piezoelectric vibrator element 16 forming an oscillation generator and oscillation sensor is disposed within an internal space 12*c* defined within the oscillator casing 12. The piezoelectric vibrator element 16 is formed into an essentially thin disc-shaped configration and fixed onto the bottom wall 12*a* of the oscillator casing 12 by way of bonding, for example, in order to cause oscillation according to oscillation of the oscillator casing 12. The central position of the oscillator casing 12 is exposed toward the outside of the protective housing 10 via a tapered opening 10*a* formed through the protective housing and a circular opening formed through the vibration insulator 14. The vibrator 16 and the vibrator casing 12 comprise a vibrator system or vibrator 28**.

The side wall **12*b* of the oscillator casing 12 defines therein a circumferentially extending space 12*d*. A flexible printed circuit board 20 has a transmitter and receiver circuit 17 mounted thereon. As will be seen from FIG. 1, the printed circuit board 20 directs the plane, on which the transmitter and receiver circuits are formed, substantially parallel to the axis of the oscillator casing 12. In addition, the printed circuit board 20 is covered with an elastic cover 22 which is made of elastic material, such as foamed urethane rubber. In practice, the printed circuit board 20 is built-in the elastic cover by molding to form a printed circuit board assembly 24. The printed circuit board assembly 24 is flexible enough to be bent along the curved periphery of the space 18 defined in the side wall 12*b* of the oscillator casing 12. The oscillator casing 12 may also be formed by molding to build-in the circuit board assembly 24 in the space 12*d***.

In the shown embodiment, the space **12*d* extends in overall length to receive the printed circuit board 20 mounting the transmitter and receiver circuits. However, the space 12*d* is not necessarily continuous through the overall length thereof. Namely, if desired, the space 12*d*** is separated into two chambers, one of which is adapted to receive a printed circuit board mounting a transmitter circuit and the other of which is adapted to receive a printed circuit board mounting a receiver circuit.

The tapered opening **10*a* and the through opening 14*a* of the vibration insulator 14 cooperate with each other to constitute an acoustic horn 26. The acoustic horn 26 is acoustically coupled with the piezoelectric vibrator element 16** for transmitting an ultrasonic wave toward an object, i.e. a road surface and receiving the ultrasonic wave reflected from the object.

With the construction set forth above, the acoustic impedance of the oscillator casing 12 made of the foamed plastic material is substantially reduced in comparison with that of the metal casing made of aluminum, stainless and so forth. This provides higher sensibility of the ultrasonic wave. In the shown embodiment, the resonating frequency of the ultrasonic transducer is set about 100 KHz. By setting the resonating frequency of the ultrasonic transducer 16 at a higher frequency than that in the conventional one, oscillation stabilization can be obtained between the transmission and reception of the ultrasonic wave. Namely, by shortening the oscillation stabilization period, echo vibration in the ultrasonic transducer during transmission of the ultrasonic wave can be satisfactorily stabilized within an interval between transmission and reception of the ultrasonic wave. This avoids interference of the transmitted ultrasonic wave during reception of the reflected ultrasonic wave. Therefore, the preferred embodiment of the ultrasonic transducer can be commonly used for transmission and reception of the ultrasonic wave.

Figure 2:
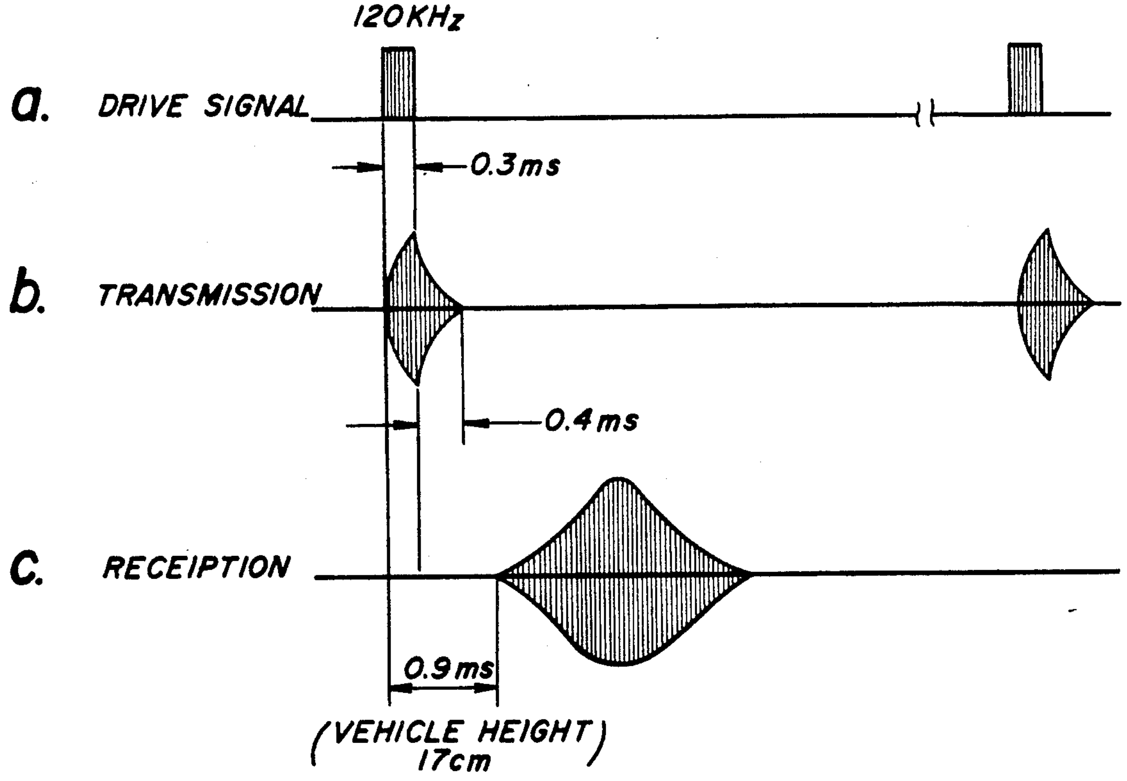
FIG. 2 is a timing chart of signals produced in the preferred embodiment of the ultrasonic transducer circuit of FIG. 1, in which (a) shows timing of a drive signal, (b) shows level of transmitted signal and (c) shows level of received signal.

FIG. 2 shows a timing chart showing the timing of transmission and receipt of the ultrasonic wave. The operation of the above-mentioned ultrasonic transducer will be described herebelow with reference to FIG. 2. In the shown embodiment, a drive signal for the piezoelectric vibrator element 16 is applied to the piezoelectric vibrator from the transmitter circuit on the printed circuit board. The drive signal is provided with a frequency of 120 KHz. and a duration of 0.3 ms. The drive signal drives the piezoelectric vibrator element 16. The piezoelectric vibrator element 16 gradually increases oscillation magnitude while the drive signal is applied as shown in (b) of FIG. 2. In the shown embodiment, the oscillation magnitude of the piezoelectric vibrator 16 gradually reduces within 0.4 ms. after termination of the drive signal.

In case of road roughness measurement by means of the preferred embodiment of the ultrasonic transducer, and assuming the road clearance of the vehicle is 17 cm and the environmental temperature is 60° C., the reflected ultrasonic wave from the road surface reaches to the ultrasonic transducer with approximately 0.9 ms. delay after starting transmission of the ultrasonic wave, as shown in (c) of FIG. 2. Therefore, the ultrasonic wave reflected from the road surface reaches the ultrasonic transducer about 0.2 ms. after complete stabilization of the oscillation of the piezoelectric vibrator element 16. This interval is long enough to allow the ultrasonic transducer to be used in common for transmission and receipt of the ultrasonic wave.

Additionally, the transmitter and receiver circuit 18 are elastically covered by the elastic cover 22. This elastic cover 22 insulates the printed circuit board 20 from vibration of the oscillator casing 12 as driven by the piezoelectric vibrator element 16. Furthermore, the oscillator casing 12 is elastically insulated from the protective cover 10 by means of the vibration insulator 14. This construction satisfactorily prevents direct transmission of the vibration from the oscillator casing 12 to the printed circuit board 20 via a vibration feedback path which is otherwise established. Therefore, echo vibration of the oscillator casing 12 can be successfully damped.

Furthermore, since the plane of the printed circuit board on which the transmitter and receiver circuits are mounted is substantially parallel to the axis of the ultrasonic transducer along which the oscillation occurs, transmission of vibration is further prevented.

As the transmitter and receiver circuit for the shown embodiment of the ultrasonic transducer, any appropriate circuits can be selected. For example, "LM1812 IC" from National Semiconductor can be used.

As set forth above, the present invention can provide a satisfactorily compact ultrasonic transducer. In addition, the ultrasonic transducer can provide sufficiently high accuracy in measuring a distance by suppressing echo vibration in transmission of the ultrasonic wave toward the object. Therefore, the present invention successfully provides an ultrasonic transducer useful as a road roughness sensor or a vehicle height sensor in an automotive suspension control or automotive height control.

What is claimed is:

1. An ultrasonic transducer comprising:
- a housing;
- a vibrator positioned within said housing and drivable at ultrasonic frequency for generating an ultrasonic wave;
- an electric transducer circuit positioned within said housing for converting an electric signal to an energy for driving said vibrator and/or detecting vibration of said vibrator and converting vibration energy of said vibrator into an electric signal; and
- an elastic means supporting said vibrator for elastically damping oscillation of said vibrator so that oscillation of said vibrator can be stabilized within a given period of time which is shorter than a minimum interval between transmission of an ultrasonic wave toward an object and reception of an ultrasonic wave reflected by said object.

2. An ultrasonic transducer as set forth in claim 1, wherein said transducer further comprises a vibrator casing securing said vibrator, said vibrator being connected to said electric transducer circuit.

3. An ultrasonic transducer as set forth in claim 2, wherein said vibrator casing is made of a material having a lower acoustic impedance than that typically found in metal.

4. An ultrasonic transducer as set forth in claim 3, wherein said vibrator casing is made of a synthetic resin.

5. An ultrasonic transducer as set forth in claim 4, wherein said vibrator casing is formed of a foamed resin.

6. An ultrasonic transducer as set forth in claim 1, wherein said electric transducer circuit includes a transmitter circuit and a receiver circuit.

7. An ultrasonic transducer as set forth in claim 6, wherein said transmitter circuit and said receiver circuit are formed on flexible printed circuit boards.

8. An ultrasonic transducer as set forth in claim 7, wherein said transmitter circuit and said receiver circuit are formed on a common flexible printed circuit board.

9. An ultrasonic transducer as set forth in claim 8, further comprising a vibrator casing securing said vibrator, said vibrator being connected to said electric transducer circuit, and said common flexible printed circuit board being built-in said vibrator casing.

10. An ultrasonic transducer as set forth in claim 9, wherein said vibrator casing is made of a material having lower acoustic impedance than that typically found in metal.

11. An ultrasonic transducer as set forth in claim 10, wherein said vibrator casing is made of a synthetic resin.

12. An ultrasonic transducer as set forth in claim 11, wherein said vibrator casing is formed of a foamed resin.

13. An ultrasonic transducer as set forth in claim 12, wherein said printed circuit board is received in said enclosed space in such a manner that a plane on which said transmitter and/or receiver circuits are formed is directed substantially parallel to a normal vibration axis of said vibrator.

14. An ultrasonic transducer as set forth in claim 13, which further comprises an elastic vibration cover for isolating said common flexible printed circuit board from said vibrator casing.

15. An ultrasonic transducer as set forth in claim 7, wherein said transducer further comprises a vibrator casing securing said vibrator, said vibrator being connected to said electric transducer circuit, and said flexible circuit boards being built-in said vibrator casing.

16. An ultrasonic transducer as set forth in claim 15, wherein said vibrator casing is made of a material having lower acoustic impedance than that typically found in metal.

17. An ultrasonic transducer as set forth in claim 16, wherein said vibrator casing is made of a synthetic resin.

18. An ultrasonic transducer as set forth in claim 17, wherein said vibrator casing is formed of a foamed plastic.

19. An ultrasonic transducer as set forth in claim 15, wherein said vibrator casing defines an annular enclosed space to receive therein said flexible printed circuit boards.

20. An ultrasonic transducer as set forth in claim 19, wherein said flexible printed circuit boards are received in said vibrator casing in such a manner that a plane on which said transmitter and/or receiver circuits are formed is directed substantially parallel to a normal vibration axis of said vibrator.

21. An ultrasonic transducer as set forth in claim 20, which further comprises an elastic cover for isolating said flexible printed circuit boards from said vibrator casing.

22. An ultrasonic transducer comprising:

a housing;

a vibrator positioned within said housing and drivable at ultrasonic frequency for generating an ultrasonic wave, said vibrator comprising a vibrator body and a vibrator casing housing therein said vibrator body for oscillation therewith at the ultrasonic frequency for generating acoustic vibration in the ultrasonic frequency range;

an electric transducer circuit positioned within said housing for converting an electric signal to an energy for driving said vibrator body and/or detecting vibration of said vibrator body and converting vibration energy of said vibrator body into an electric signal; and an elastic means supporting said vibrator for elastically damping said vibrator.

23. An ultrasonic transducer as set forth in claim 22, wherein said electric transducer circuit is elastically supported in said housing by means of an elastic cover.

24. An ultrasonic transducer as set forth in claim 23, wherein said elastic cover is so coupled with said vibrator casing as to dampen oscillation of said vibrator casing from said electric transducer circuit.

25. An ultrasonic transducer as set forth in claim 24, wherein said vibrator casing is made of a material having lower acoustic impedance than that typically found in metal.

26. An ultrasonic transducer as set forth in claim 25, wherein said vibrator casing is made of a synthetic resin.

27. An ultrasonic transducer as set forth in claim 26, wherein said vibrator casing is formed of a foamed plastic.

28. An ultrasonic transducer as set forth in claim 27, wherein said electric transducer circuit includes a transmitter circuit and a receiver circuit.

29. An ultrasonic transducer as set forth in claim 28, wherein said transmitter circuit and said receiver circuit are formed on flexible printed circuit board.

30. An ultrasonic transducer as set forth in claim 29, said transmitter circuit and said receiver circuit are formed on a common flexible printed circuit board.

31. An ultrasonic transducer as set forth in claim 30, wherein said common flexible printed circuit board is built-in said vibrator casing.

32. An ultrasonic transducer as set forth in claim 31, wherein said vibrator housing defines an annular enclosed space to receive therein said common flexible printed circuit board.

33. An ultrasonic transducer as set forth in claim 32, wherein said common flexible printed circuit board is received in said enclosed space in such a manner that a plane on which said transmitter and receiver circuits are formed is directed substantially parallel to a vibration axis of said vibrator.

34. An ultrasonic transducer as set forth in claim 33, which further comprises an elastic vibration cover isolating said common flexible printed circuit board from said vibrator casing.

35. An ultrasonic transducer comprising:

a housing;

a vibrator positioned within said housing and drivable at an ultrasonic frequency for generating an ultrasonic wave, said vibrator further converting an electric signal to a vibration energy and/or detecting and converting vibration energy into an electric signal;

an electric transducer circuit positioned within said housing for transferring electric signals to and from said vibrator; and an elastic means for elastically damping oscillation of said vibrator so that oscillation of said vibrator can be stabilized within a given period of time which is shorter than a minimum interval between transmission of an ultrasonic wave toward an object and reception of an ultrasonic wave reflected by said object, wherein said housing has an enclosed space to receive therein components of said electric transducer circuit.

36. An ultrasonic transducer as set forth in claim 35, wherein said components are received in said enclosed space in such a manner that a plane on which said electric transducer circuit is formed is directed substantially parallel to a normal vibration axis of said vibrator.

37. An ultrasonic transducer as set forth in claim 36, which further comprises an elastic vibration cover isolating said components from said vibrator.

38. An ultrasonic transducer comprising:

a housing;

a vibrator drivable at ultrasonic frequency for generating an ultrasonic wave, said vibrator further converting a first electric signal to a vibration energy and/or detecting and converting vibration energy into a second electric signal a vibrator casing positioned within said housing and housing therein, said vibrator for oscillation therewith at the ultrasonic frequency for generating acoustic vibration in the ultrasonic frequency range;

an electric transducer circuit built-in said vibrator casing and associated with said vibrator for transferring electric signals to and from said vibrator;

an elastic means for elastically damping oscillation of said vibrator; and an elastic cover for isolating said electric transducer circuit from said vibrator casing, wherein said vibrator casing defines an annular enclosed space to receive therein said electric transducer circuit.

39. An ultrasonic transducer as set forth in claim 38, wherein said electric transducer circuit is received in said enclosed space in such a manner that a plane on which said electric transducer circuit is formed is directed substantially parallel to a vibration axis of said vibrator.

40. An ultrasonic transducer as set forth in claim 39, which further comprises an elastic vibration cover isolating said electronic transducer circuit from said vibrator case.

* * * * *